(12) United States Patent
Seo

(10) Patent No.: US 12,532,481 B2
(45) Date of Patent: Jan. 20, 2026

(54) RESISTIVE MEMORY DEVICE PROGRAMMED USING BI-DIRECTIONAL DRIVING CURRENTS

(71) Applicant: SK hynix Inc., Icheon-si (KR)

(72) Inventor: Sung Kil Seo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 604 days.

(21) Appl. No.: 17/970,311

(22) Filed: Oct. 20, 2022

(65) Prior Publication Data

US 2023/0130547 A1 Apr. 27, 2023

(30) Foreign Application Priority Data

Oct. 22, 2021 (KR) .......................... 10-2021-0141864
Oct. 5, 2022 (KR) .......................... 10-2022-0127195

(51) Int. Cl.
*G11C 13/00* (2006.01)
*H10B 63/00* (2023.01)

(52) U.S. Cl.
CPC ......... *H10B 63/80* (2023.02); *G11C 13/0028* (2013.01)

(58) Field of Classification Search
CPC ............ G11C 13/0028; G11C 13/0097; G11C 2213/77; G11C 13/0026; G11C 13/003; G11C 13/0069; H10B 63/80; H10B 63/30
See application file for complete search history.

(56) References Cited

U.S. PATENT DOCUMENTS

| | | | | |
|---|---|---|---|---|
| 6,418,043 B1* | 7/2002 | Kang | ....................... | G11C 8/08 365/185.23 |
| 9,324,423 B2* | 4/2016 | Castro | ................ | G11C 13/0004 |
| 9,646,688 B2* | 5/2017 | Scheuerlein | ......... | H10B 63/845 |
| 10,727,403 B2* | 7/2020 | Yim | ..................... | G11C 7/18 |
| 11,302,365 B2* | 4/2022 | Kumar | ................... | G11C 11/418 |
| 12,159,670 B2* | 12/2024 | Hiraga | .................... | G11C 5/141 |
| 2007/0223269 A1* | 9/2007 | Saito | ..................... | H10B 61/22 365/158 |
| 2017/0032838 A1* | 2/2017 | Park | .................... | G11C 13/0002 |
| 2021/0012828 A1* | 1/2021 | Kim | .................... | G11C 11/4097 |
| 2021/0295910 A1* | 9/2021 | Pellizzer | ............ | G11C 13/0028 |
| 2022/0366978 A1 | 11/2022 | Baek et al. | | |
| 2022/0366979 A1* | 11/2022 | Lin | .................... | G11C 13/0026 |
| 2023/0024213 A1* | 1/2023 | Sugimae | .............. | H10N 70/063 |
| 2023/0422471 A1* | 12/2023 | Carman | ................ | H10B 12/20 |

\* cited by examiner

*Primary Examiner* — Khamdan N. Alrobaie
(74) *Attorney, Agent, or Firm* — WILLIAM PARK AND ASSOCIATES LTD.

(57) ABSTRACT

A resistive memory device may include a first and second signal lines, a memory layer, a first and second drivers, and a first contact structure. The first signal line may include a first contact node. The first and second signal lines may intersect. The second signal line may include a second contact node. The memory layer may be at an intersecting portion between the first and second signal lines and the memory layer may be configured to change its resistance based on a voltage difference between the first and second signal lines. The first and second drivers may be configured to selectively provide the first contact node with a first power voltage and a second power voltage different from the first power voltage, respectively. The first contact structure may be configured to electrically connect the first contact node with the first and second drivers.

15 Claims, 14 Drawing Sheets

RESISTIVE MEMORY DEVICE PROGRAMMED USING BI-DIRECTIONAL DRIVING CURRENTS

CROSS-REFERENCES TO RELATED APPLICATION

The present application claims priority under 35 U.S.C. § 119(a) to Korean patent application numbers 10-2021-0141864, filed on Oct. 22, 2021, and 10-2022-0127195, filed on Oct. 5, 2022 in the Korean Intellectual Property Office, which are incorporated herein by references in their entirety.

BACKGROUND

1. Technical Field

Various embodiments generally relate to a semiconductor memory device, more particularly, to a resistive memory device programmed using bi-directional driving currents.

2. Related Art

Generally, a resistive memory device may include a memory cell array including a plurality of memory cells and a control circuit block configured to drive the memory cells.

The memory cells may include a plurality of word lines, a plurality of bit lines intersected with the word lines and a variable resistive layer located at each of intersecting points of the word lines and the bit lines. Thus, the memory cell array may be referred to as a cross point type memory cell array.

Additionally, as integration increases, multi-stack layered memory cells may be used rather than single-layered memory cells. Further, in order to improve memory characteristics of the variable resistive layer, the memory cells may be driven by bi-directional driving currents in place of uni-directional driving current.

The resistive memory device may have a peri-under-cell (PUC) structure including a peripheral circuit region for driving the memory cell and a memory cell array stacked on the peripheral circuit region.

However, use of the PUC structure and the bi-directional driving currents, may result in different length driving current paths for one or more memory cells, such as, a set current path and a reset current path.

When the set driving current path is different from the reset driving current path, an operation current value of the memory cell, a read margin, a read time and a write time may be changed in accordance with the position of a selected memory cell.

SUMMARY

According to example embodiments, there may be provided a resistive memory device. The resistive memory device may include a first signal line, a second signal line, a memory layer, a first driver, a second driver, and a first contact structure. The first signal line may include a first contact node. The second signal line may intersect the first signal line. The second signal line may include a second contact node. The memory layer may be at an intersection portion between the first signal line and the second signal line. The memory layer may be configured to change its resistance based on a voltage difference between the first signal line and the second signal line. The first driver may be configured to selectively provide the first contact node with a first power voltage. The second drive may be configured to selectively provide the first contact node with a second power voltage different from the first power voltage. The first contact structure may be configured to electrically connect the first contact node with the first driver and the second driver.

According to example embodiments, there may be provided a resistive memory device. The resistive memory device may include a lower deck, a peripheral circuit layer, a first contact structure, and a second contact structure. The lower deck may include a lower memory cell that includes a first level word line, a bit line, and a lower memory layer that may be sequentially stacked. The first level word line may include a first contact node. The first level word line may be extended in a first direction. The bit line may include a second contact node. The bit line may be extended in a second direction intersected with the first direction. The memory layer may be arranged at an intersected point between the first level word line and the bit line. The peripheral circuit layer may be arranged under the lower deck. The peripheral circuit layer may include a first word line driver, a second word line driver, a first bit line driver, and a second bit line driver. The first word line driver may be configured to selectively provide the first contact node with a first power voltage. The second word line driver may be configured to selectively provide the first contact node with a second power voltage different from the first power voltage. The first bit line driver may be configured to selectively provide the second contact node with the first power voltage. The second bit line driver may be configured to selectively provide the second contact node with the second power voltage. The first contact structure may be configured to electrically connect the first word line driver, the second word line driver, and the first contact node of the first level word line. The second contact structure may be configured to electrically connect the first bit line driver, the second bit line driver, and the second contact node of the bit line.

According to example embodiments, there may be provided a resistive memory device. The resistive memory device may include a memory cell array and a peripheral circuit layer. The memory cell array may include a first signal line, a second signal line, and a memory cell connected between the first signal line and the second signal line. The peripheral circuit layer may include a first driving block and a second driving block. The first driving block may be configured to generate a first driving current from the first signal line to the second signal line via the memory cell. The second driving block may be configured to generate a second driving current from the second signal line to the first signal line via the memory cell. The first signal line may include a first contact node configured to selectively receive the first driving current and the second driving current. The second signal line may include a second contact node configured to selectively receive the first driving current and the second driving current.

According to example embodiments, each of the word lines and each of the bit lines in the resistive memory device may receive the different power voltages.

BRIEF DESCRIPTION OF THE DRAWINGS

Various example embodiments, aspects, features, and advantages of the subject matter of the present disclosure will be more clearly understood from the following detailed description taken in conjunction with the accompanying drawings, in which.

DETAILED DESCRIPTION

Various embodiments of the present disclosure will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present disclosure as defined in the appended claims.

The present disclosure is described herein with reference to cross-section and/or plan illustrations of idealized embodiments of the present disclosure. However, the present disclosure should not be construed as being limited to only the provided embodiments. Although a few embodiments of the present invention will be shown and described, it will be appreciated by those of ordinary skill in the art that changes may be made in these embodiments without departing from the principles and spirit of the present disclosure.

Figure 1:
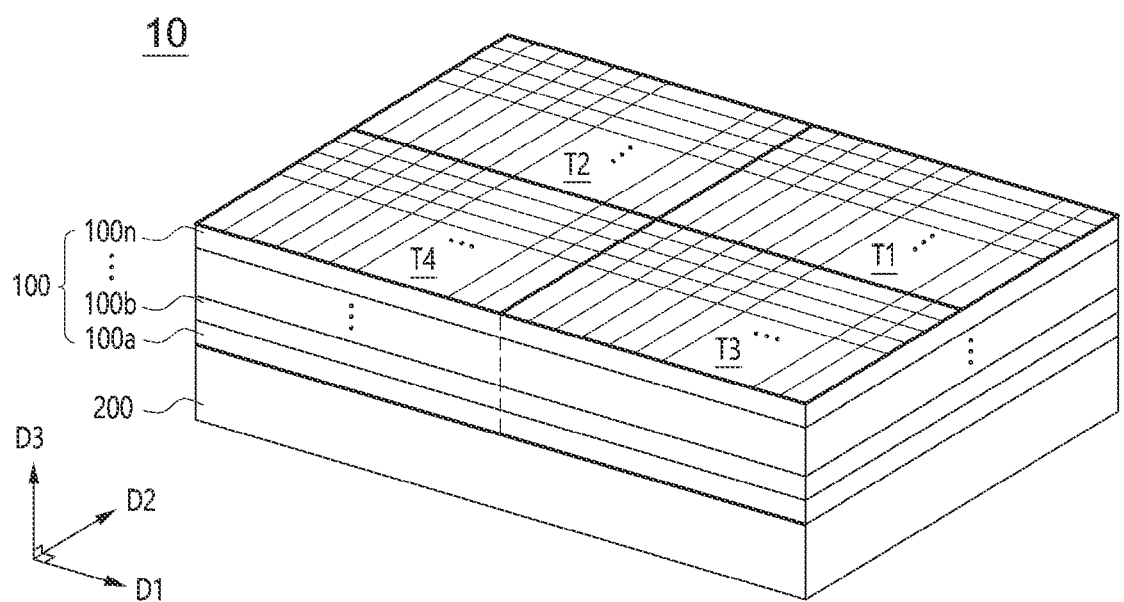
FIG. 1 is a perspective view illustrating a resistive memory device in accordance with example embodiments.

FIG. 1 is a perspective view illustrating a resistive memory device in accordance with example embodiments.

Referring to FIG. 1, a resistive memory device 10 of example embodiments may include a memory cell array 100 and a peripheral circuit layer 200.

The memory cell array 100 may be stacked on the peripheral circuit layer 200. The memory cell array 100 may include at least one deck. In example embodiments, the memory cell array 100 may include a plurality of decks 100a~100n. Each deck may include a plurality of memory cells arranged in a substantially same plane. For example, the memory cells of deck 100a may be said to be located on first plane, memory cells of deck 100b may be said to be located on a second plane, etc.

In some embodiments, decks 100a~100n may be symmetrical with respect to a stacked surface. However, other embodiments may have decks that vary in size and/or shape.

Each of the decks 100a~100n may be classified into a plurality of tiles for effectively controlling the memory cells. The decks 100a~100n may be classified into first to fourth tiles T1~T4. While some embodiments may have four tiles T1~T4 per deck, the number of tiles for a deck may differ in different embodiments. For example, in an embodiment, a deck may have 6 tiles, or 8 tiles, etc. In some embodiments, the number of tiles may vary from deck to deck.

The peripheral circuit layer 200 may include various control circuits for controlling the memory cells. In some embodiments, there may be a dedicated control circuit for each of the first to fourth tiles T1~T4.

In drawings, a first direction D1 may be an extending direction of a word line in the memory cell array 100. A second direction D2 may be an extending direction of a bit line in the memory cell array 100. A direction D3 may be vertical to the first direction D1 and the second direction D2. Accordingly, directions D1 and D2 may indicate a planar area of the peripheral circuit layer 200 and the decks 100a~100n. The direction D3 may indicate stacking direction of the decks 100a~100n and the peripheral circuit layer 200.

Figure 2:
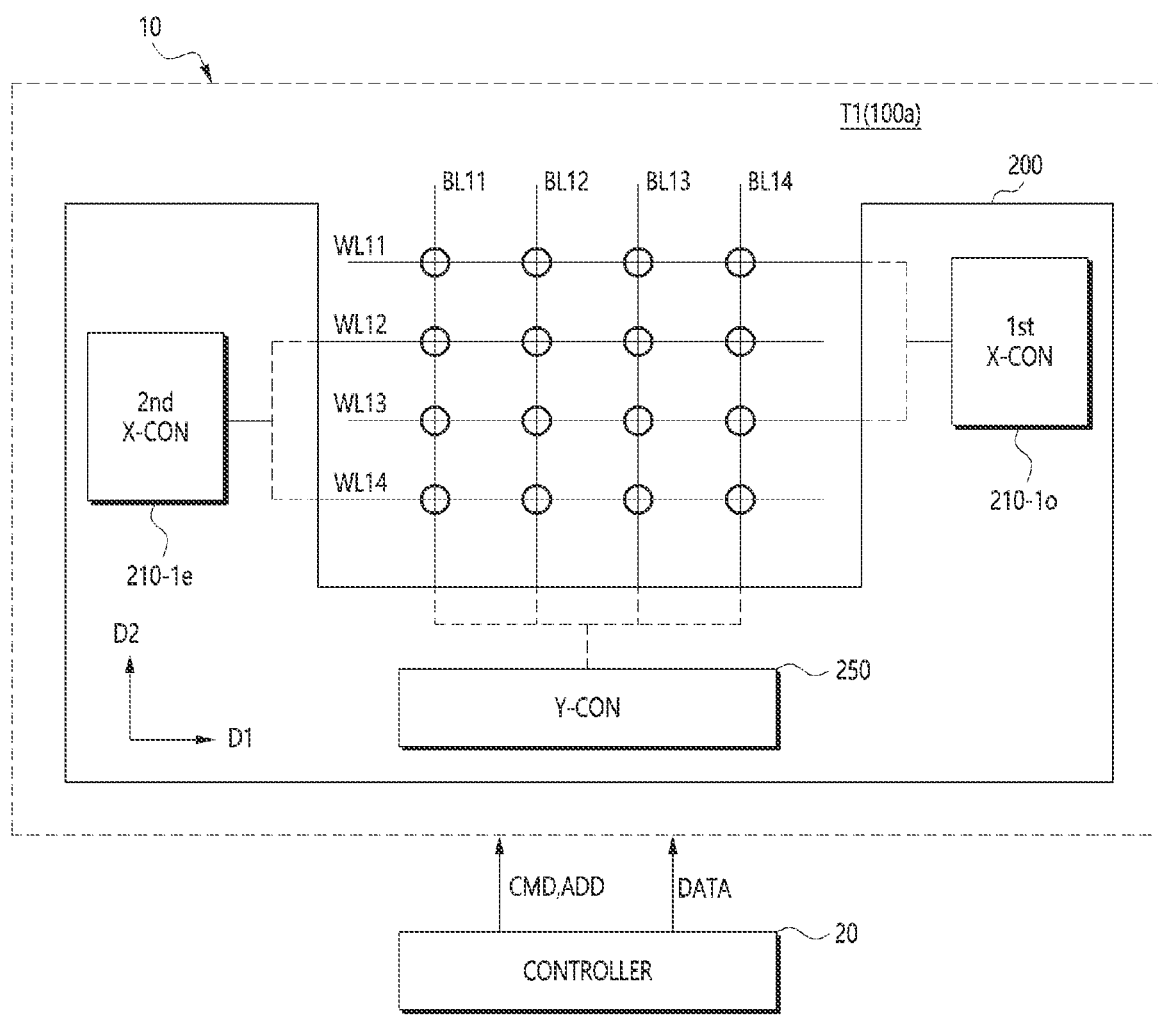
FIG. 2 is a block diagram illustrating a memory system including a resistive memory device in accordance with example embodiments.

FIG. 2 is a block diagram illustrating a memory system including a resistive memory device in accordance with example embodiments. FIG. 2 may show a structure of the first tile T1 of the first deck 100a in the resistive memory device 10 of FIG. 1.

Referring to FIGS. 1 and 2, the first tile T1 of the resistive memory device 10 may include a plurality of first signal lines and a plurality of second signal lines. The first signal lines may be extended in the first direction D1. The second signal lines may be extended in the second direction D2 substantially perpendicular to the first direction D1.

In example embodiments, the first signal lines may include first to fourth word lines WL11~WL14, and the second signal lines may include first to fourth bit lines BL11~BL14.

The first to fourth word lines WL11~WL14 may be arranged on a first plane. The first to fourth word lines WL11~WL14 may be extended to be parallel to each other. The first to fourth bit lines BL11~BL14 may be arranged on a second plane different from the first plane. The first to fourth bit lines BL11~BL14 may be extended to be parallel to each other. Hereinafter, the plane may refer to a two dimensional plane located at substantially same height measured from a reference surface. In this disclosure, items on a plane may be said to be level (with each other) or have the same height.

A memory layer (shown in FIGS. 11 and 12) may be arranged at intersections of the first to fourth word lines WL11~WL14 and the first to fourth bit lines BL11~BL14, respectively. For example, the memory layer may include a variable resistance layer having a resistance that may change when a voltage no less than a critical voltage is applied. The memory layer may include at least one of, for example, a chalcogenide compound, a transition metal compound, ferroelectrics substance, a ferromagnetic substance, etc.

The resistive memory device 10 may further include at least one deck 100a including a plurality of memory cells MC. Each of the memory cells MC may include a memory layer positioned where the word line intersects the bit line. The positioned memory layer may be, for example, a portion of a larger memory layer. Accordingly, because the word lines WL11~WL14 and the bit lines BL11~BL14 intersect each other, the memory cells MC may be arranged in a matrix shape.

The first to fourth word lines WL11~WL14 may be controlled by X-control blocks 210-1o and 210-1e. The first to fourth bit lines BL11~BL14 may be controlled by a Y-control block 250.

The resistive memory device 10 may further include various control circuits. The control circuits may be positioned in the peripheral circuit layer 200. The control circuits may include an X-control block and a Y-control block 250. In example embodiments, the X-control block may include a first X-control block 210-1o and a second X-control block 210-1e. The first X-control block 210-1o may be connected to the odd numbered word lines WL11 and WL13. The second X-control block 210-1e may be connected to the even numbered word lines WL12 and WL14. The Y-control block 250 may be connected to the bit lines BL11~BL14.

In FIG. 2, the first X-control block 210-1o may be arranged at one side of the word lines WL11~WL14 and the second X-control block 210-1e may be arranged at the other side of the word lines WL11~WL14. The Y-control block 250 may be arranged at one side of the bit lines BL11~BL14. Alternatively, positions of the first X-control block 210-1o, the second X-control block 210-1e and the Y-control block 250 may be changed.

A controller 20, which may be an external controller such as, for example, a processor, a memory controller, etc., may provide the resistive memory device 10 with a driving command CMD, an address ADD and data DATA for driving the resistive memory device 10. The control circuits of the resistive memory device 10 may receive the driving command CMD, the address ADD and the data DATA to generate control signals for selecting a target memory cell.

Figure 3:
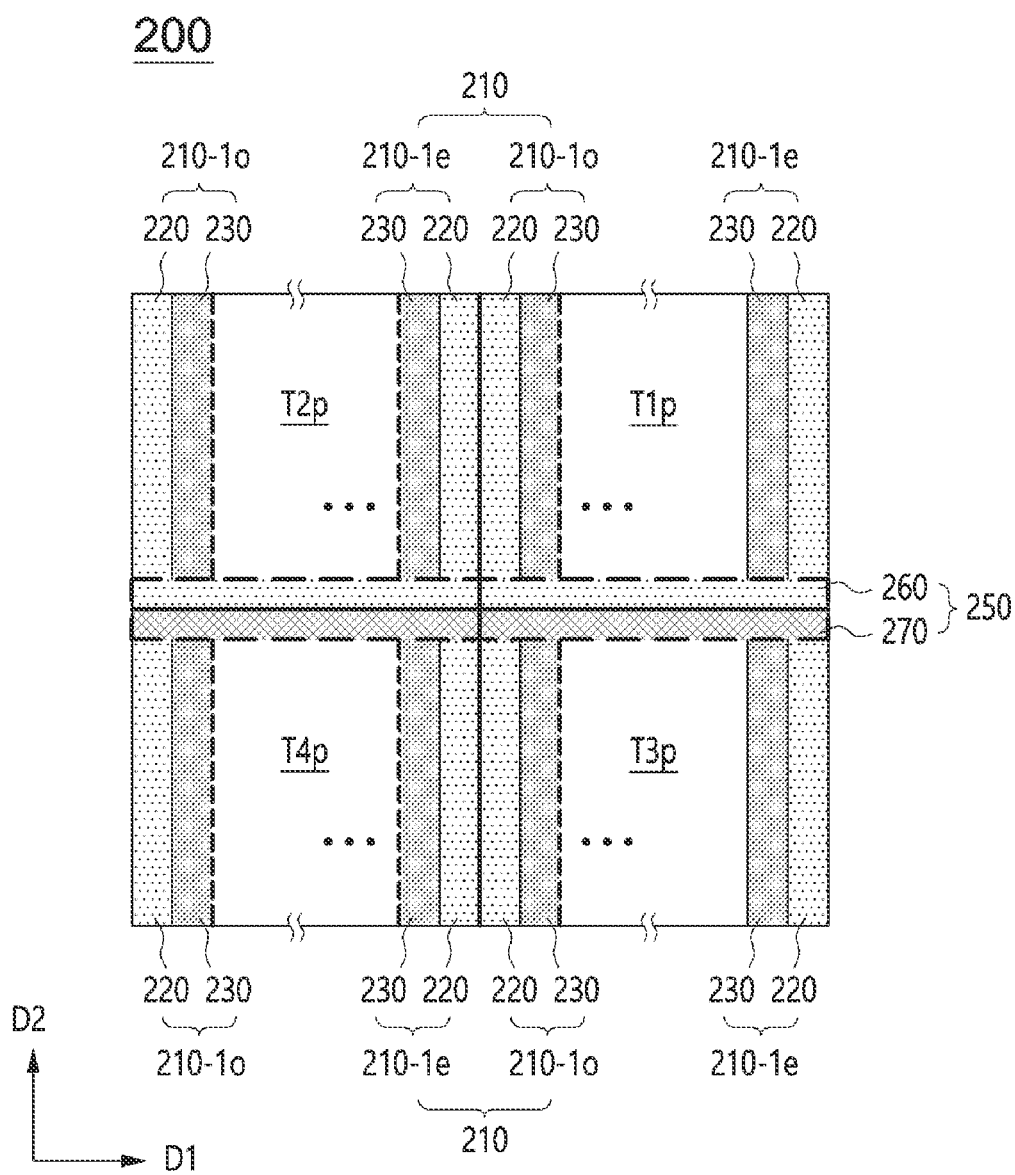
FIG. 3 is a plan view illustrating a peripheral circuit layer in accordance with example embodiments.

FIG. 3 is a plan view illustrating a peripheral circuit layer of the resistive memory device in accordance with example embodiments.

Referring to FIG. 3, the peripheral circuit layer 200 may be classified into first to fourth peripheral regions T1p~T4p that substantially correspond to the first to fourth tiles T1~T4.

The first to fourth peripheral regions T1p~T4p may include the X-control block 210 and a part of the Y-control block 250.

In example embodiments, in order to connect the X-control block 210 with the word lines extended in the first direction D1, the X-control block 210 may be arranged along the second direction D2. For example, the X-control block 210 may be arranged at a boundary area between the first peripheral region T1p and the second peripheral region T2p and a boundary area between the third peripheral region T3p and the fourth peripheral region T4p.

In order to connect the Y-control block 250 with the bit lines extended in the second direction D2, the Y-control block 250 may be arranged along the first direction D1. For example, the Y-control block 250 may be arranged at a boundary area between the first peripheral region T1p and the third peripheral region T3p and a boundary area between the second peripheral region T2p and the fourth peripheral region T4p.

For example, the first odd X-control block 210-1o may be arranged next to the first to fourth peripheral regions T1p~T4p, respectively. Each of the first odd X-control blocks 210-1o may be positioned to the left of each of the peripheral regions T1p~T4p. The first odd X-control block 210-1o may be connected to the odd numbered word lines WL11 and WL13 of a corresponding tile.

The first even X-control block 210-1e may be arranged on the first to fourth peripheral regions T1p~T4p, respectively. Each of the first even X-control blocks 210-1e may be positioned to the right edge of each of the peripheral regions T1p~T4p. The first even X-control block 210-1e may be connected to the even numbered word lines WL12 and WL14 of the corresponding tile.

Each of the first odd X-control blocks 210-1o and the first even X-control blocks 210-1e may include a first word line driver 220 and a second word line driver 230.

The Y-control block 250 may include a first bit line driver 260 and a second bit line driver 270. Although not shown in the drawing, the Y-control block 250 may include an odd Y-control block and an even Y-control block so that the odd numbered bit lines BL11 and BL14 and the even numbered bit lines may be controlled at different positions like the X-control block 210.

Alternatively, when the resistive memory device 10 includes a plurality of decks 100a~100n sequentially stacked as shown in FIG. 1, the X-control block 210 and the Y-control block 250 may be provided for each of the decks 100a~100n.

Figure 4A:
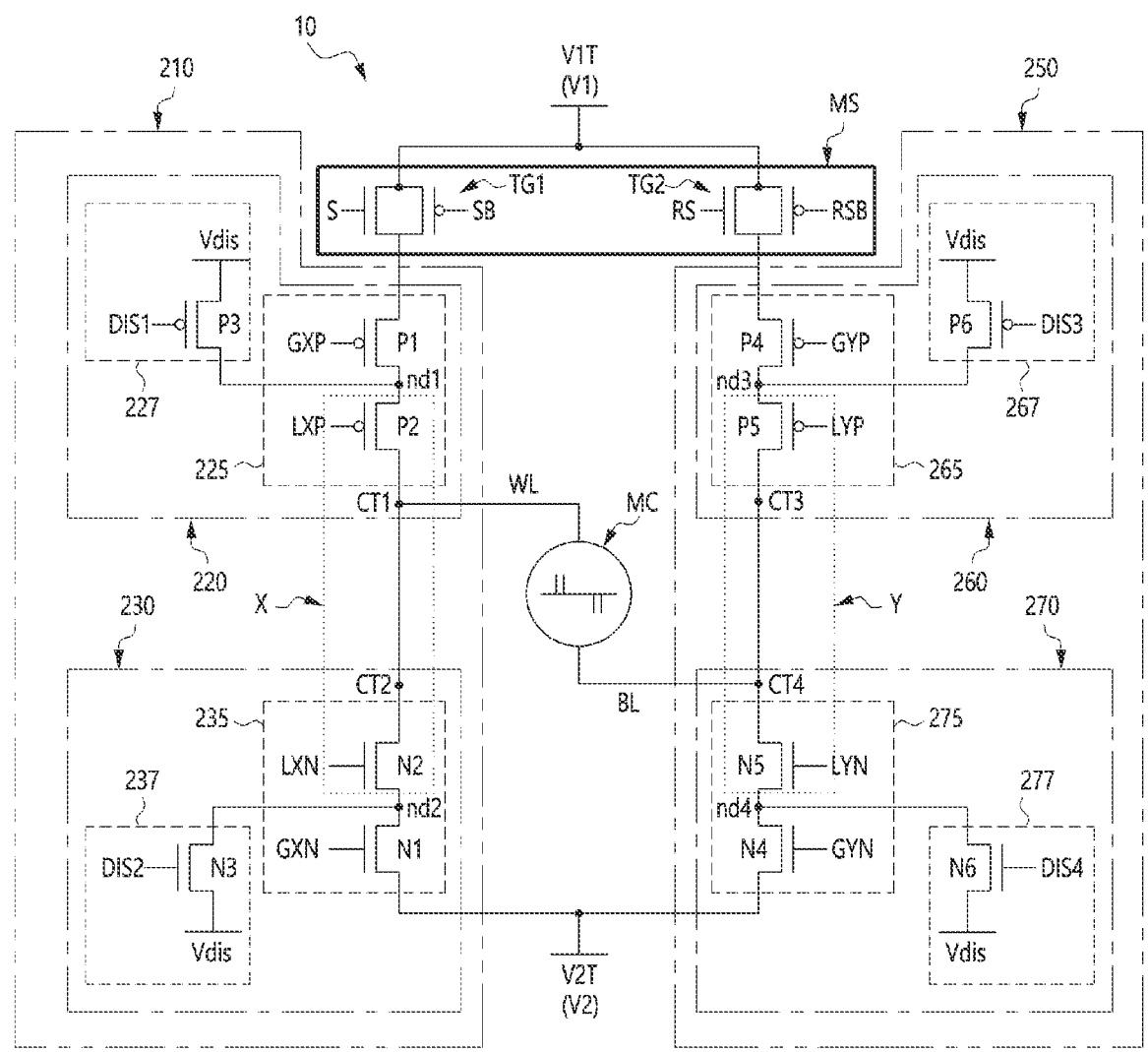
FIG. 4A is a circuit diagram illustrating a resistive memory device in accordance with example embodiments.
Figure 4B:
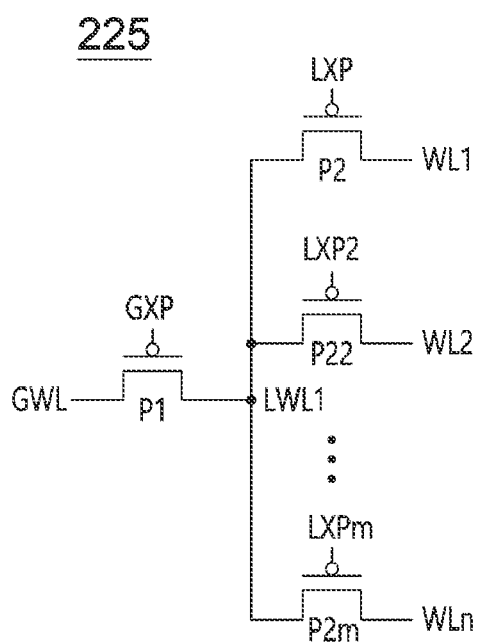
FIG. 4B is a circuit diagram illustrating a connection between a global word line switch and a local word line switch in accordance with example embodiments.

FIG. 4A is a circuit diagram illustrating a resistive memory device in accordance with example embodiments and FIG. 4B is a circuit diagram illustrating a connection between a global word line switch and a local word line switch in accordance with example embodiments.

Referring to FIG. 4A, the resistive memory device 10 may include a mode selector MS, an X-control block 210, a word line WL, a memory cell MC, a bit line BL and a Y-control block 250.

The mode selector MS may select a type of driving current based on the driving command CMD in FIG. 2. The mode selector MS may be configured to selectively connect a first power voltage terminal V1T with the X-control block 210 or the first power voltage terminal V1T with the Y-control block 250.

The mode selector MS may include a first transfer gate TG1 and a second transfer gate TG2. The first transfer gate TG1 may selectively connect the first power voltage terminal V1T with the X-control block 210 in response to a first control signal S and a first control signal bar SB. The first control signal S and the first control signal bar SB may be generated with opposite logic levels based on the driving command CMD for programming the memory cell MC in set state. Accordingly, it should be understood that when one of the signals S or SB is said to be in a logic state, the other of the signals S or SB is in the opposite logic state.

For example, when the first control signal S is set to logic high and the first control signal bar SB is set to a logic low, a first power voltage V1 may be selectively provided to the X-control block 210 via the first power voltage terminal V1T.

The second transfer gate TG2 may selectively connect the first power voltage terminal V1T with the Y-control block 250 based on a second control signal RS and a second control signal bar RSB. The second control signal RS and the second control signal bar RSB may be generated with opposite logic levels based on the driving command CMD for programming the memory cell MC in reset state. Accordingly, it should be understood that when one of the signals RS or RSB is said to be in a logic state, the other of the signals RS or RSB is in the opposite logic state. In example embodiments, the logic level of the second control signal RS may be opposite to the logic level of the first control signal S. When the second control signal RS is set to logic high and the second control signal bar RSB is set to logic low, the first power voltage V1 may be selectively provided to the Y-control block 250 via the first power voltage terminal V1T.

The X-control block 210 may include the first word line driver 220 and the second word line driver 230. For example, the first odd X-control block 210-1o and the first even X-control blocks 210-1e of the FIGS. 2 and 3 may represent the X-control block 210 of FIG. 4A.

The first word line driver 220 may be selectively connected between the mode selector MS and a target word line WL to transmit the first power voltage V1 to the selected word line WL.

The first word line driver 220 may include a first word line switching unit 225 and a first discharging unit 227. The first word line switching unit 225 may include a first PMOS transistor P1 and a second PMOS transistor P2. The first PMOS transistor P1 may be referred to as a first global word line switch. The first PMOS transistor P1 may selectively connect the first transfer gate TG1 of the mode selector MS with the second PMOS transistor P2 based on a first global word line selection signal GXP. In various embodiments, there may be a plurality of first PMOS transistors that form the first global word line switch.

The second PMOS transistor P2 may be referred to as a first local word line switch. The second PMOS transistor P2 may electrically connect the first PMOS transistor P1 to the target word line WL based on a first local word line selection signal LXP. A reference numeral nd1 may indicate a first connection node connected between the first PMOS transistor P1 and the second PMOS transistor P2. The first global word line selection signal GXP and the first local word line selection signal LXP may be generated based on the address ADD provided from the controller 20. In various embodiments, there may be a plurality of second PMOS transistors that form the first local word line switch.

In example embodiments, the first global word line switch, the first local word line switch, and the word line WL may be connected in a hierarchy structure based on a decoding signal processing method.

Referring to FIG. 4B, the first global word line switch P1 may selectively connect a global word line GWL with a plurality of local word lines LWL1 in response to the first global word line selection signal GXP. The first local word line switch P2~P2m may selectively connect a selected local word line LWL1 with a plurality of word lines WL1~WLn based on the response to the first local word line selection signal LXP~LXPm. Numbers of the local word lines LWL (for example, LWL1) may be greater than numbers of the global word lines GWL and less than numbers of the word lines WL1~WLn.

The first discharging unit 227 in FIG. 4A may include a third PMOS transistor P3. The third PMOS transistor P3 may be turned on based on a first discharge enable signal DIS1. When the third PMOS transistor P3 is turned on, a discharging voltage Vdis may be transmitted to the first connection node nd1 to discharge the word line WL. For example, the first discharging unit 227 may be driven after the first control signal S is disabled.

The second word line driver 230 may selectively connect the word line WL with a second power voltage terminal V2T to selectively provide the word line WL with the second power voltage V2. The first word line driver 220 and the second word line driver 230 may be alternately driven.

The second word line driver 230 may include a second word line switching unit 235 and a second discharging unit 237. The second word line switching unit 235 may include a first NMOS transistor N1 and a second NMOS transistor N2. The first NMOS transistor N1 may be referred to as a second global word line switch. The first NMOS transistor N1 may transmit the second power voltage V2 to a second connection node nd2 based on a second global word line selection signal GXN. The second NMOS transistor N2 may correspond to a second local word line switch. The second NMOS transistor N2 may selectively connect the second node nd2 with the word line WL based on a second local word line selection signal LXN. The first NMOS transistor N1 and the second NMOS transistor N2 of the second word line switching unit 235 may be connected with each other in the hierarchy structure as shown in FIG. 4B. In various embodiments, there may be a plurality of first NMOS transistors N1 that form the second global word line switch, and a plurality of second NMOS transistors N2 that form the second local word line switch.

The second discharging unit 237 may include a third NMOS transistor N3. The third NMOS transistor N3 may be turned on based on a second discharge enable signal DIS2. When the third NMOS transistor N3 is turned on, the discharging voltage Vdis may be transmitted to the second connection node nd2 to discharge the word line WL using the discharging voltage Vdis. For example, the second discharging unit 237 may be driven after the second control signal RS is disabled.

The Y-control block 250 may include a first bit line driver 260 and a second bit line driver 270.

The first bit line driver 260 may be connected between the mode selector MS and the bit line BL to transmit the first power voltage V1 to the selected bit line BL.

The first bit line driver 260 may include a first bit line switching unit 265 and a third discharging unit 267. The first bit line switching unit 265 may include a fourth PMOS transistor P4 and a fifth PMOS transistor P5. The fourth PMOS transistor P4 may correspond to a first global bit line switch. The fourth PMOS transistor P4 may transmit the first power voltage V1 transmitted through the second transfer gate TG2 of the mode selector MS to a third connection node nd3 based on a first global bit line selection signal GYP. In various embodiments, there may be a plurality of fourth PMOS transistors that form the first global bit line switch.

The fifth PMOS transistor P5 may correspond to a first local bit line switch. The fifth PMOS transistor P5 may selectively connect the third connection node nd3 with the selected bit line WL based on a first local bit line selection signal LYP. In various embodiments, there may be a plurality of fifth PMOS transistors that form the first local bit line switch.

The third discharging unit 267 may include a sixth PMOS transistor P6. The sixth PMOS transistor P6 may be turned on based on a third discharge enable signal DIS3. When the third PMOS transistor P3 is turned on, the discharging voltage Vdis may be transmitted to the third connection node nd3. When the discharging voltage Vdis is applied to the third connection node nd3 and the fifth PMOS transistor P5 is turned on, the bit line BL may be discharged. For example, the third discharging unit 267 may be driven after the second control signal RS is disabled.

The second bit line driver 270 may selectively connect the bit line BL with the second power voltage terminal V2T to selectively provide the bit line BL with the second power voltage V2.

The second bit line driver 270 may include a second bit line switching unit 275 and a second discharging unit 277. The second bit line switching unit 275 may include a fourth NMOS transistor N4 and a fifth NMOS transistor N5. The fourth NMOS transistor N4 may correspond to a second global bit line switch. The fourth NMOS transistor N4 may transmit the second power voltage V2 to a second connection node nd4 based on a second global bit line selection signal GYN. The fifth NMOS transistor N5 may correspond to a second local bit line switch. The fifth NMOS transistor N5 may selectively connect the fourth node nd4 with the bit line BL based on a second local bit line selection signal LYN. The fourth NMOS transistor N4 and the fifth NMOS transistor N5 of the second bit line switching unit 275 may be connected with each other in a hierarchy structure similar to that shown FIG. 4B. In various embodiments, there may be a plurality of fourth NMOS transistors N4 that form the second global bit line switch, and a plurality of fifth NMOS transistors N5 that form the second local bit line switch.

The second discharging unit 277 may include a sixth NMOS transistor N6. The sixth NMOS transistor N6 may be turned on based on a fourth discharge enable signal DIS4. When the sixth NMOS transistor N6 is turned on, the discharging voltage Vdis may be transmitted to the fourth connection node nd4 to discharge the bit line BL. For example, the fourth discharging unit 277 may be driven after the first control signal S is disabled.

Figure 5A:
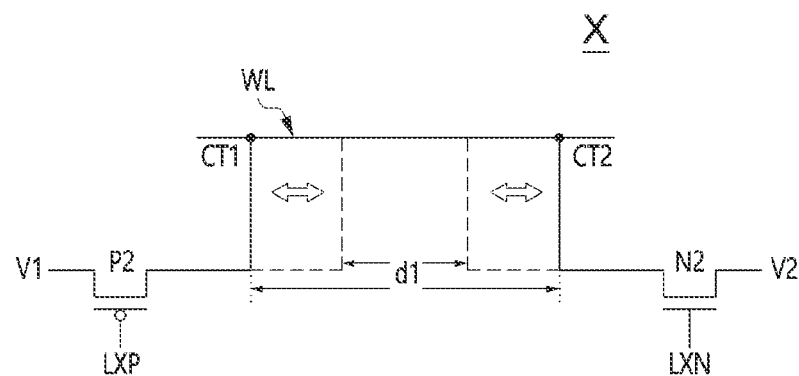
FIG. 5A is a circuit diagram illustrating a portion "X" in FIG. 4A.
Figure 5B:
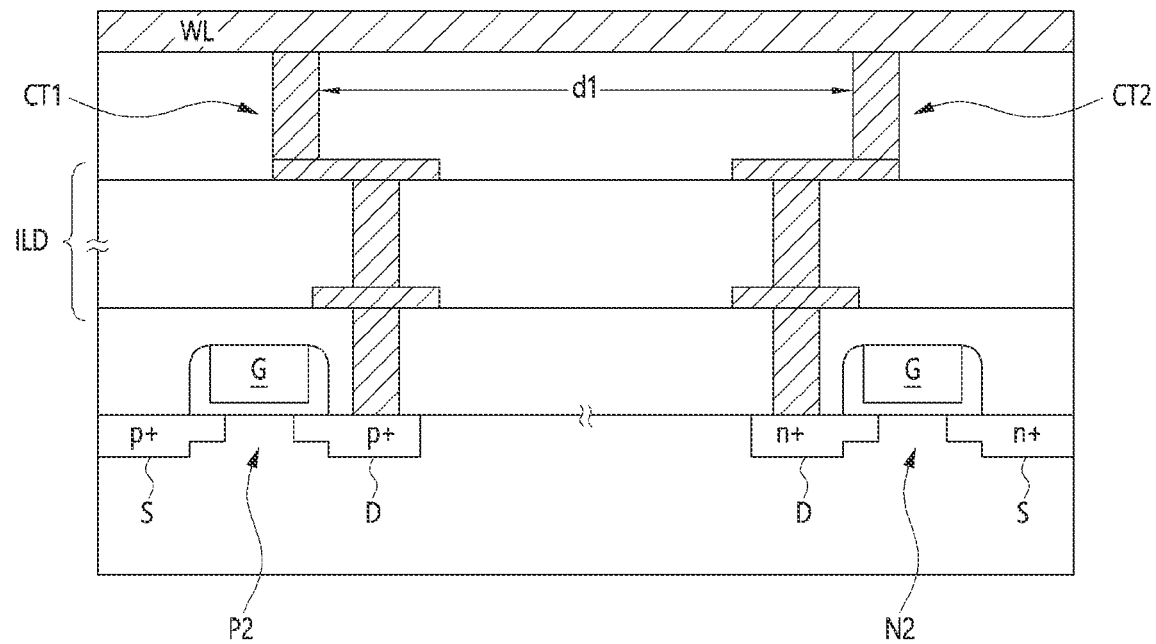
FIG. 5B is a cross-sectional view illustrating a word line contact structure in FIG. 5A.
Figure 6A:
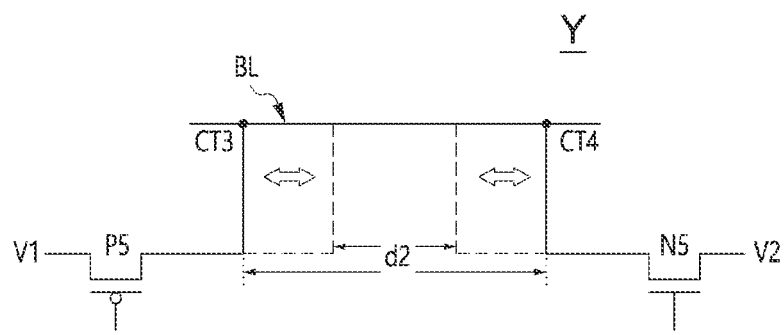
FIG. 6A is a circuit diagram illustrating a portion "Y" in FIG. 4A.
Figure 6B:
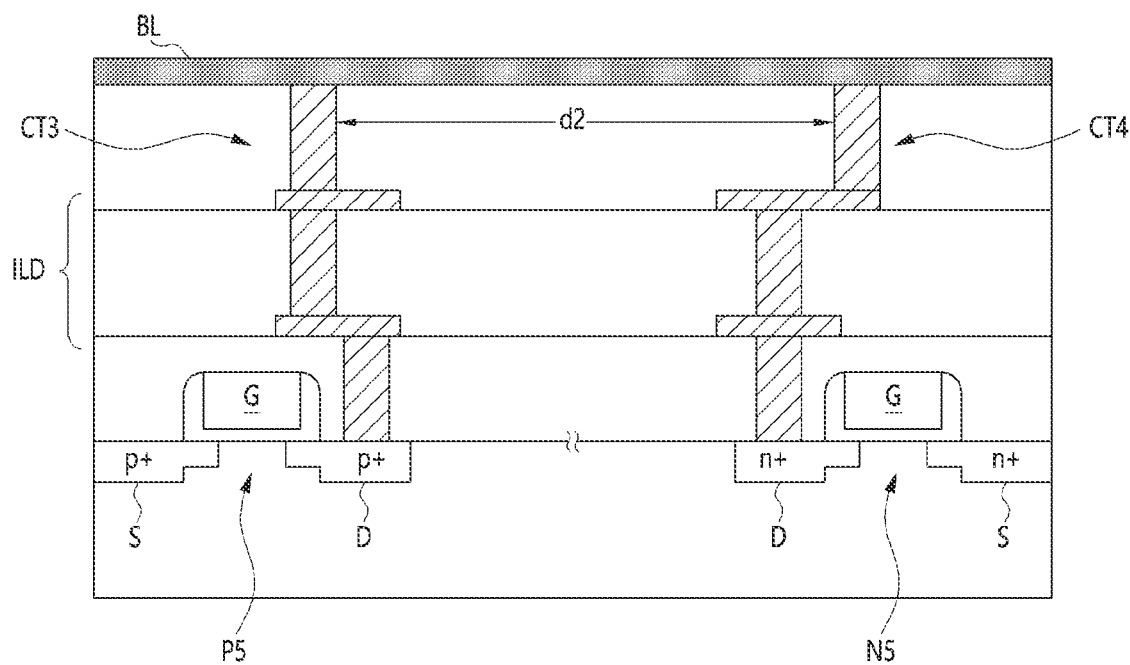
FIG. 6B is a cross-sectional view illustrating a bit line contact structure in FIG. 6A.

FIG. 5A is a circuit diagram illustrating a portion "X" in FIG. 4A, FIG. 5B is a cross-sectional view illustrating a word line contact structure in FIG. 5A, FIG. 6A is a circuit diagram illustrating a portion "Y" in FIG. 4A and FIG. 6B is a cross-sectional view illustrating a bit line contact structure in FIG. 6A.

Referring to FIGS. 4A, 5A, and 5B, the selected word line WL may selectively receive the first power voltage V1 through a first contact CT1 connected to the second PMOS transistor P2 of the first word line driver 220, or the second power voltage V2 through a second contact CT2 connected to the second NMOS transistor N2 of the second word line driver 230 based on the first and second control signals S and RS. One or more insulating interlayers ILD may be between the substrate where the PMOS transistor P2 and the NMOS transistors N2 are formed and a layer where the first and second contacts CT1 and CT2 are formed. The insulating layers ILD are described in more detail with respect to FIGS. 11 and 12.

Referring to FIGS. 4A, 6A, and 6B, the selected bit line BL may selectively receive the first power voltage V1 through a third contact CT3 connected to the fifth PMOS transistor P5 of the first bit line driver 260, or the second power voltage V2 through a fourth contact CT4 connected to the fifth NMOS transistor N5 of the second bit line driver 270. One or more insulating interlayers ILD may be between the substrate where the PMOS transistor P5 and the NMOS transistors N5 are formed and a layer where the third and fourth contacts CT3 and CT4 are formed.

As the number of the memory cells in the deck and the tile is increased, a distance to the control circuits including the X-control block 210 and the Y-control block 250 may be different for each memory cell. Currently, a technology is proposed for controlling near memory cells closer to the control circuit versus far memory cells farther from the control circuit than the near memory cells.

For example, the memory cell MC may be programmed by bi-directional currents. That is, the memory cell MC may be programmed to a set state using a current (hereinafter, a "set current") flowing from the word line WL to the bit line BL. The memory cell MC may be programmed to a reset state using a current (hereinafter, a "reset current") flowing from the bit line BL to the word line WL. The word line WL may receive the first or second power voltages V1 or V2 through the first or second contacts CT1 or CT2, respectively, and the bit line BL may receive the first or second power voltages V1 or V2 through the third or fourth contacts CT3 or CT4, respectively. Accordingly, a distance d1 between the first contact CT1 and the second contact CT2 on the word line WL and a distance d2 between the third contact CT3 and the fourth contact CT4 on the bit line BL may vary depending on the position of the selected memory cell. Therefore, a length of the set current path and a length of the reset current path of the selected memory cell MC may be different. Further explanations are given below with respect to FIGS. 7 and 8 to show how the different lengths can be handled.

Figure 7:
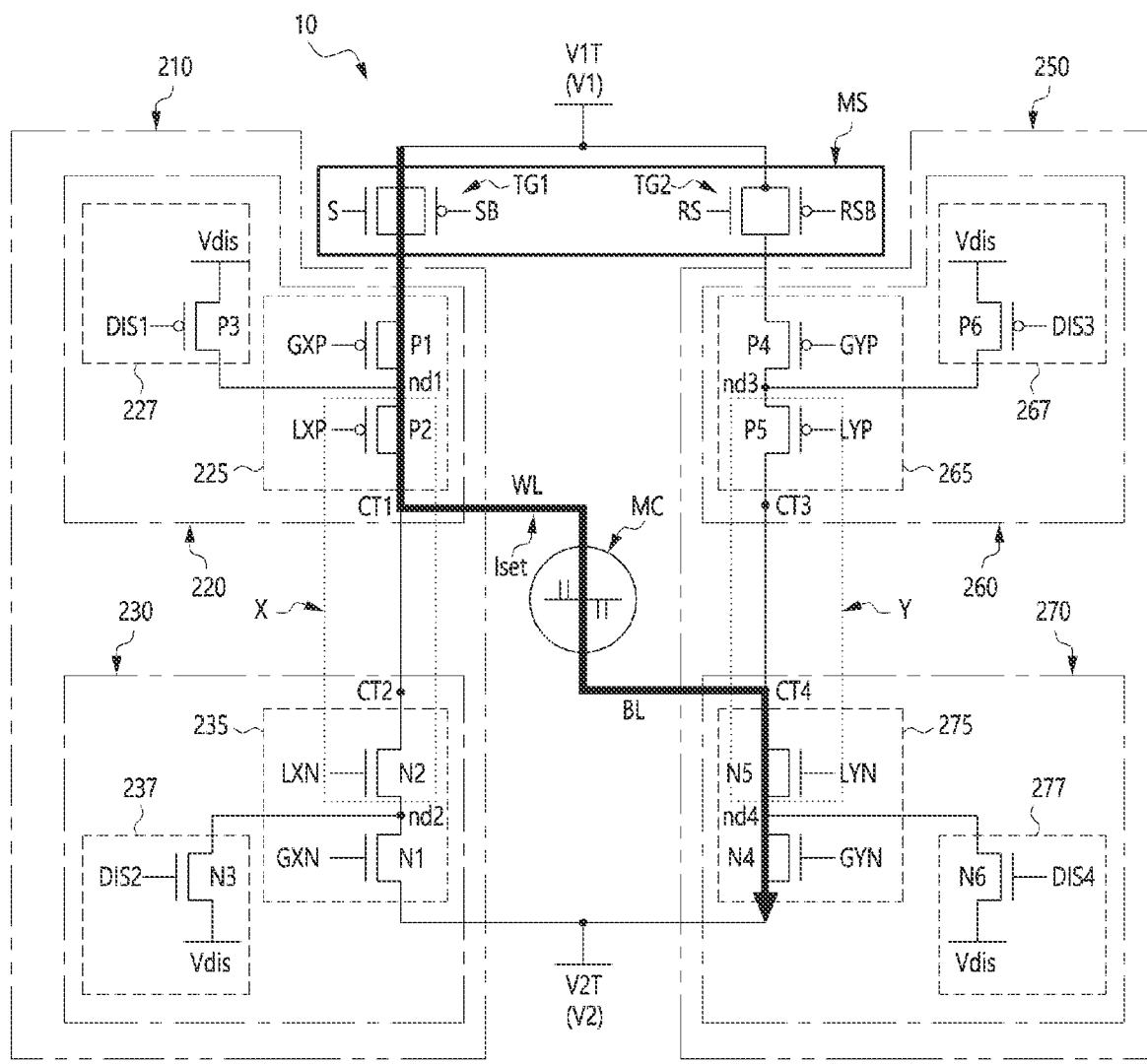
FIG. 7 is a circuit diagram illustrating a set operation of a resistive memory device in accordance with example embodiments.
Figure 8:
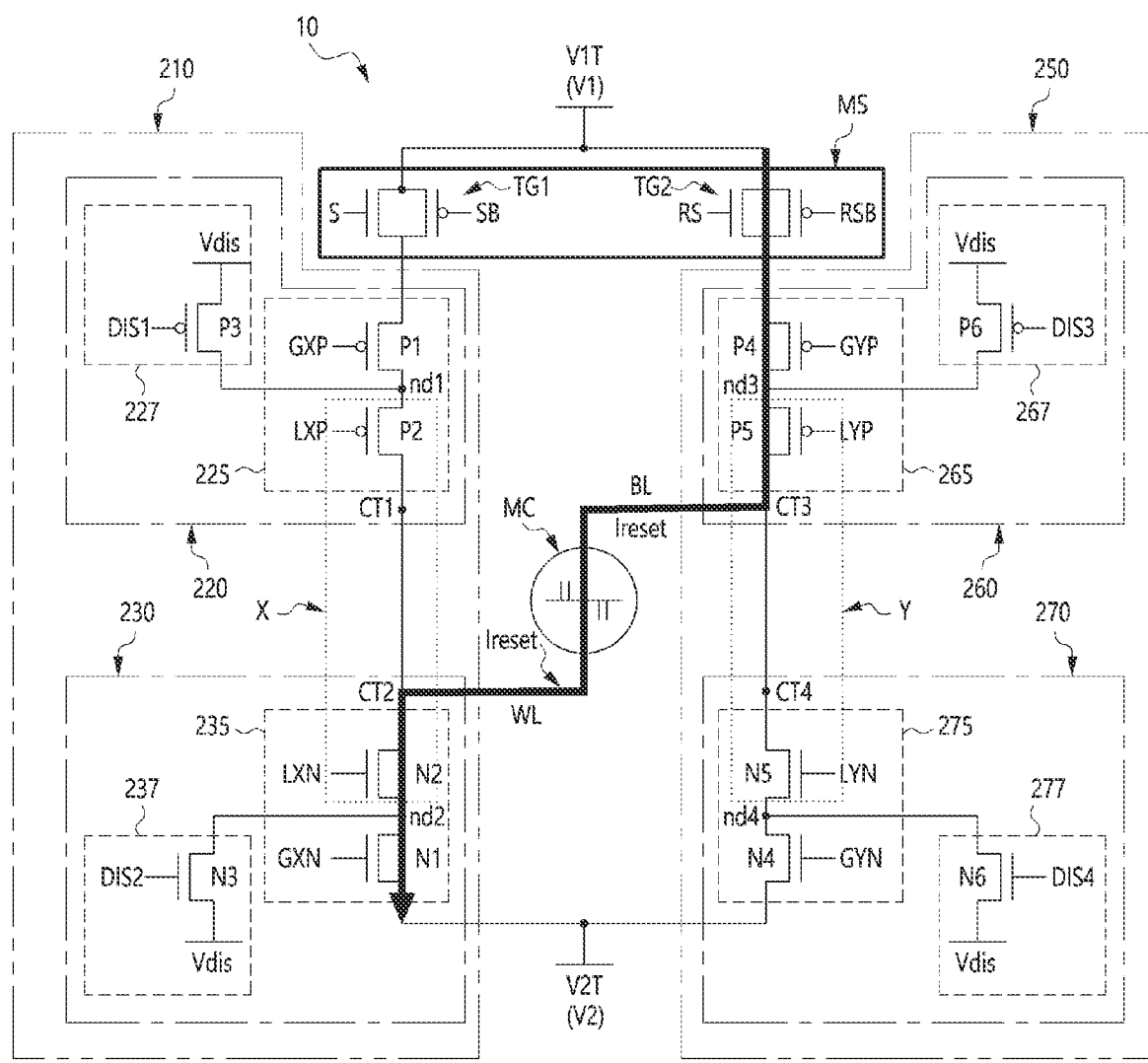
FIG. 8 is a circuit diagram illustrating a reset operation of a resistive memory device in accordance with example embodiments.

FIG. 7 is a circuit diagram illustrating a set operation of a resistive memory device in accordance with example embodiments and FIG. 8 is a circuit diagram illustrating a reset operation of a resistive memory device in accordance with example embodiments.

A set program operation of the resistive memory device 10 is described with reference to FIGS. 2 to 7.

For a set program of a memory cell MC in a specific position, the controller 20 may input the address ADD and the driving command CMD into the resistive memory device 10. The control circuit in the peripheral circuit layer 200 may generate the first control signal S having a logic high level and the second control signal RS having a logic low level. Further, the control circuit may provide various driving signals for the first word line driver 220 and the second bit line driver 270 acting as a first driving block to generate a set current in the selected memory cell.

Therefore, the first transfer gate TG1 of the mode selector MS may be turned on and the second transfer gate TG2 may be turned off. The first power voltage V1 may be transmitted to a source of the first PMOS transistor P1 through the first transfer gate TG1.

In order to electrically connect the first word line driver 220 to the target word line WL, the control circuit may generate the first global word line selection signal GXP having a logic low level and the first local word line selection signal LXP having a logic low level. Thus, the first PMOS transistor P1 and the second PMOS transistor P2 of the first word line driver 220 connected to the target word line WL may be turned on. A current/voltage transmission path may be generated from the first power voltage terminal V1T to a drain of the second PMOS transistor P2. The first power voltage V1 transmitted to the drain of the second PMOS transistor P2 may then be transmitted to the target word line WL through the first contact CT1.

In order to electrically connect the second bit line driver 270 to the target bit line BL, the control circuit may generate the second global word line selection signal GYN having a logic high level and the second local word line selection signal LYN having a logic high level. Thus, the fourth NMOS transistor N4 and the fifth NMOS transistor N5 of the second bit line driver 270 connected to the target bit line BL may be sequentially turned on. A current/voltage transmission path may be generated from the second power voltage terminal V2T to a drain of the fifth NMOS transistor N5. Accordingly, the second power voltage V2 transmitted to the drain of the fifth NMOS transistor N5 may then be transmitted to the target bit line BL through the fourth contact CT4.

A difference between the first power voltage V1 and the second power voltage V2 may be greater than a critical voltage for changing a resistance of the memory layer. In example embodiments, the first power voltage V1 may have a voltage level greater than the second power voltage V2 by the critical voltage.

When the first power voltage V1 is applied to the target word line WL and the second power voltage V2 is applied to the target bit line BL, a voltage of no less than the critical voltage may be applied to the memory cell MC to program the resistance of the memory cell MC to the set state.

The voltage V1 may be at a higher voltage than the voltage V2. Therefore, in programming the memory cell MC to the set state, a set current may be generated from the target word line WL connected to the first power voltage terminal V1T having a relatively higher voltage level than the target bit line BL connected to the second power voltage terminal V2T having a relatively lower voltage level. The length of a path of the set current Iset flowing through the memory cell MC may be the length between the first contact CT1 and the fourth contact CT4.

After the set programming of the memory cell MC, the first global word line selection signal GXP and the second global bit line selection signal GYN may be disabled. The first and fourth discharge enable signals DIS1 and DIS4 for turning on the first and fourth discharging units 227 and 277 may be enabled. Thus, the target word line WL charged with the first power voltage V1 and the target bit line BL charged with the second power voltage V2 may be discharged to the level of the discharging voltage Vdis.

A reset program operation of the resistive memory device 10 is described with reference to FIGS. 2 to 8.

For a reset program of a memory cell in a specific position, the controller 20 may input the address ADD and the driving command CMD into the resistive memory device 10. The control circuit in the peripheral circuit layer 200 may generate the second control signal RS having a logic high level and the first control signal S having a logic low level. Further, the control circuit in the peripheral circuit layer 200 may provide various driving signals for the first bit line driver 260 and the second word line driver 230 acting as a second driving block to generate a reset current for the selected memory cell MC.

Therefore, the second transfer gate TG2 of the mode selector MS may be turned on in accordance with voltage levels of the first and second control signals S and RS. In contrast, the first transfer gate TG1 may be turned off. The first power voltage V1 may be transmitted to a source of the fourth PMOS transistor P4 through the second transfer gate TG2.

In order to electrically connect the bit line driver 260 to the target bit line BL, the control circuit may generate the first global bit line selection signal GYP having a logic low level and the first local bit line selection signal LYP having a logic low level. Thus, the fourth PMOS transistor P4 and the fifth PMOS transistor P5 of the first bit line driver 260 connected to the target bit line BL may be turned on. The first power voltage V1 may then be transmitted to a drain of the fifth PMOS transistor P5. The target bit line BL may receive the first power voltage V1 through the third contact CT3 connected to the drain of the fifth PMOS transistor P5.

In order to electrically connect the second word line driver 230 to the target word line WL, the control circuit may generate the second global word line selection signal GXN having a logic high level and the second local word line selection signal LXN having a logic high level. Thus, the first NMOS transistor N1 and the second NMOS transistor N2 of the second word line driver 230 connected to the target word line WL may be turned on. Accordingly, the second power voltage V2 may be transmitted to the drain of the second NMOS transistor N2 from the second power voltage terminal V2T. The second power voltage V2 may then be transmitted to the target word line WL through the second contact CT2.

When a voltage difference of no less than the critical voltage is between the target bit line BL and the target word line WL, the reset current may be generated in the memory cell MC to program the resistance of the memory cell MC to the reset state.

Accordingly, when programming the memory cell MC to the reset state, a reset current may be generated from the target bit line BL connected to the first power voltage terminal V1T having a relatively higher voltage level than the target word line WL connected to the second power voltage terminal V2T having a relatively lower voltage level. The length of a path of the reset current Ireset flowing through the memory cell MC may be the length between the third contact CT3 and the second contact CT2.

After the reset program of the memory cell MC, the second global word line selection signal GXN and the first global bit line selection signal GYP may be disabled. The second and third discharge enable signals DIS2 and DIS3 for turning on the second and third discharging units 237 and 267 may be enabled. Thus, the target bit line BL charged with the first power voltage V1 and the target word line WL charged with the second power voltage V2 may be discharged to the level of the discharging voltage Vdis.

According to example embodiments, the positions of the first and second contacts CT1 and CT2 may be different from each other for different word lines. Further, the positions of the third and fourth contacts CT3 and CT4 may be different from each other for different bit lines. Therefore, the length of the set current path may be different from the length of the reset current path for the same memory cell.

Figure 9:
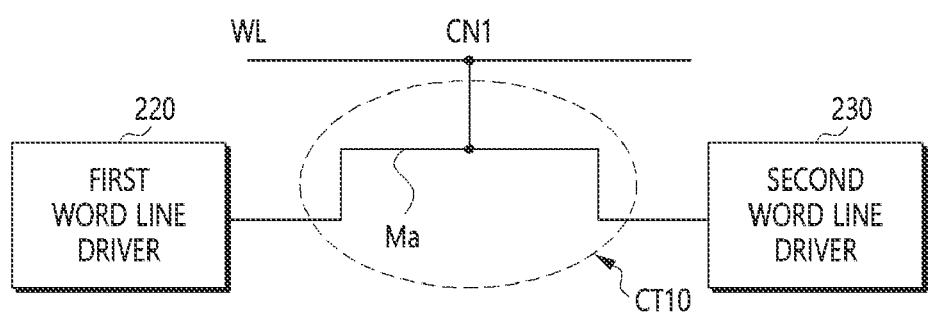
FIG. 9 is a schematic block diagram illustrating a word line contact of a resistive memory device in accordance with example embodiments.
Figure 10:
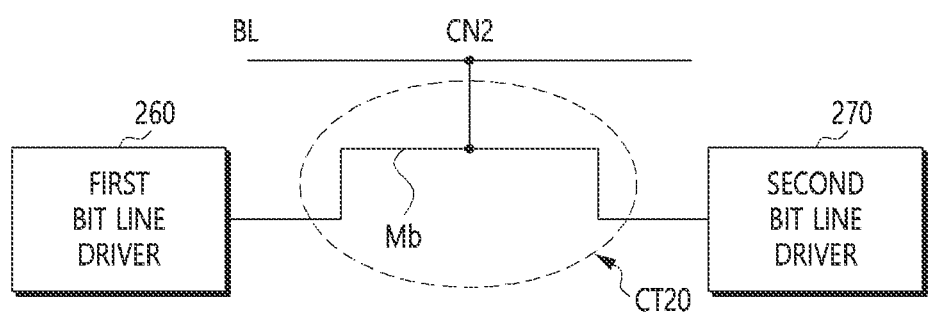
FIG. 10 is a schematic block diagram illustrating a bit line contact of a resistive memory device in accordance with example embodiments.

FIG. 9 is a schematic block diagram illustrating a word line contact of a resistive memory device in accordance with example embodiments and FIG. 10 is a schematic block diagram illustrating a bit line contact of a resistive memory device in accordance with example embodiments.

Referring to FIG. 9, the word line WL may include a single first contact node CN1. The first contact node CN1 of the word line WL may be physically (or selectively and electrically) connected to the first word line driver 220 and the second word line driver 230 through a word line contact structure CT10. For example, the first contact node CN1 of the word line WL may be electrically connected to a selected one of the first word line driver 220 and the second word line driver 230 through a word line contact structure CT10.

In example embodiments, the word line contact structure CT10 may include at least one horizontal connection member and at least one vertical connection member. The horizontal connection member may connect the first word line driver 220 with the second word line driver 230 before the word line WL is formed. The horizontal connection member may include a conductive wiring Ma corresponding to one of interconnection lines formed in the peripheral circuit layer 200. The conductive wiring Ma may be extended in a horizontal direction substantially parallel to a surface of the word line WL. Since the conductive wiring Ma may be formed before the word line WL is formed, the conductive wiring Ma may be located on a different plane from the word line WL, that is, under the word line WL. For example, the horizontal direction may include the first direction D1 or the second direction D2 of FIG. 2.

The vertical connection member may electrically and physically connect the horizontal connection member and the first contact node CN1 of the word line WL. The vertical connection member may be extended in a vertical direction corresponding to the third direction D3 of FIG. 1. For example, the vertical connection member may include at least one contact plug.

Referring to FIG. 10, the bit line BL may include a single second contact node CN2. The second contact node CN2 of the bit line BL may be physically (or selectively and electrically) connected to the first bit line driver 260 and the second bit line driver 270 through a bit line contact structure CT20. For example, the second contact node CN2 of the bit line BL may be electrically connected to a selected one of the first bit line driver 260 and the second bit line driver 270 through a bit line contact structure CT20.

In example embodiments, the bit line contact structure CT20 may also include at least one horizontal connection member and at least one vertical connection member. The horizontal connection member may connect the first bit line driver 260 with the second bit line driver 270 before the bit line BL is formed. The horizontal connection member of the bit line contact structure CT20 may include a conductive wiring Mb corresponding to one of the interconnection lines formed in the peripheral circuit layer 200. The conductive wiring Mb may be extended in the horizontal direction substantially parallel to surfaces of the word line WL and the bit line BL. Since the conductive wiring Mb may be formed before the bit line BL is formed, the conductive wiring Mb may be located on a different plane from the word line WL and the bit line BL, that is, under the word line WL. For example, the horizontal direction may include the first direction D1 or the second direction D2 of FIG. 2.

The vertical connection member of the bit line contact structure CT20 may electrically and physically connect the horizontal connection member and the second contact node CN2 of the word line WL. The vertical connection member may be extended in a vertical direction corresponding to the third direction D3 of FIG. 1. For example, the vertical connection member may include at least one contact plug.

The word line WL may receive the first power voltage V1 from the first word line driver 220 or the second power voltage V2 from the second word line driver 230 through the first contact node CN1.

The bit line BL may receive the first power voltage V1 from the first bit line driver 260 or the second power voltage V2 from the second bit line driver 270 through the second contact node CN2.

Figure 11:
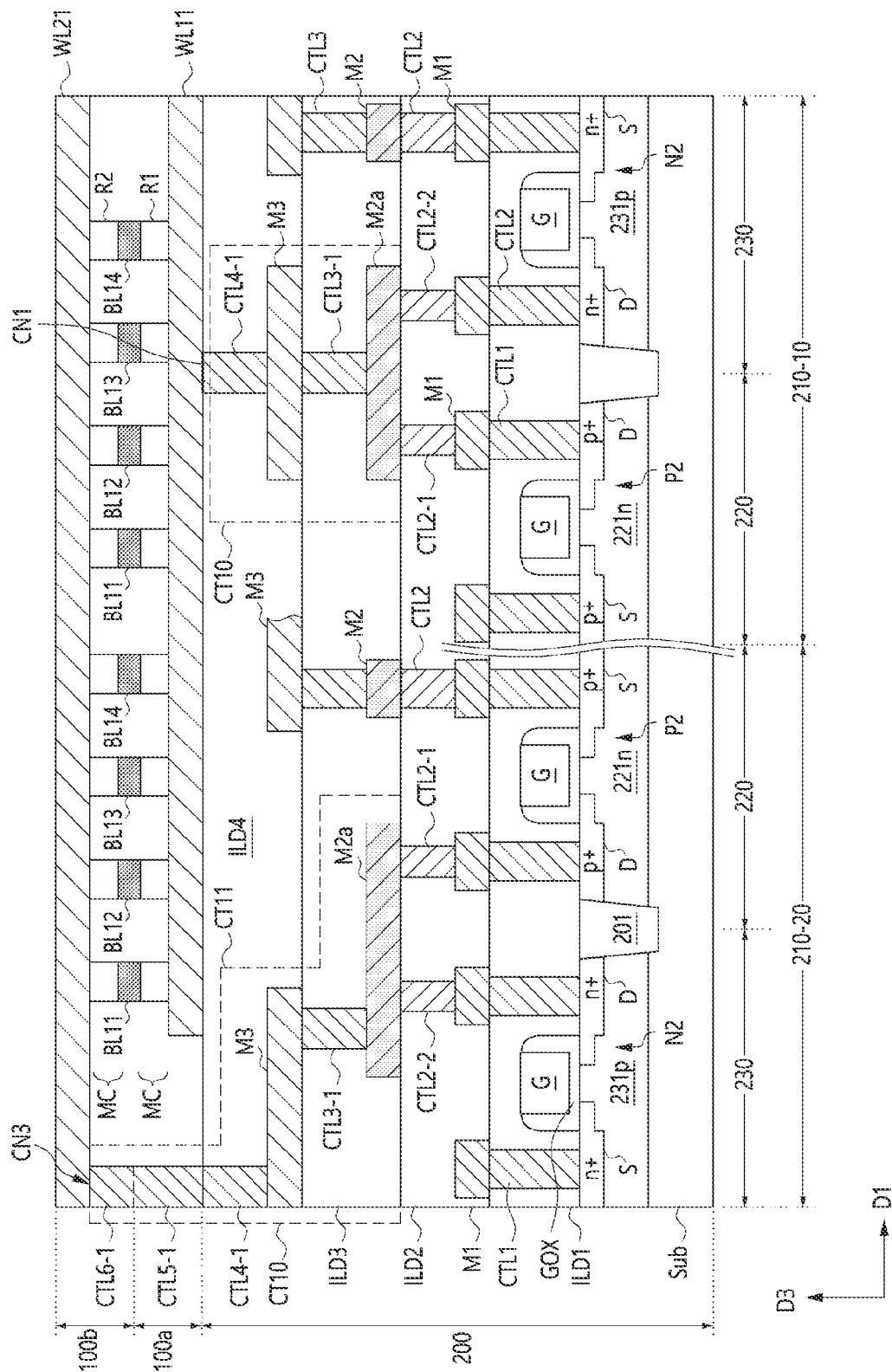
FIG. 11 is a cross-sectional view illustrating a word line contact structure in accordance with example embodiments.
Figure 12:
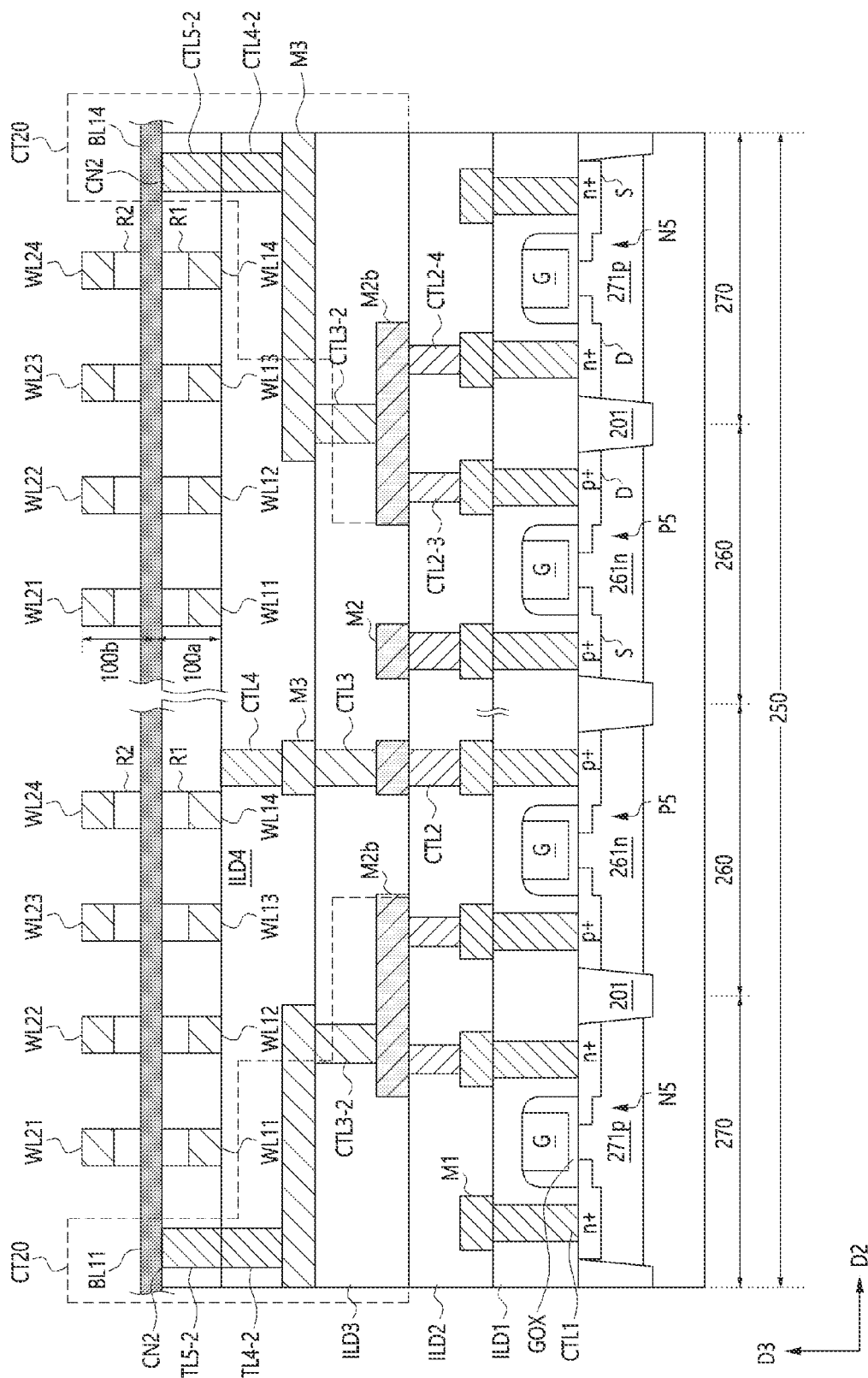
FIG. 12 is a cross-sectional view illustrating a bit line contact structure in accordance with example embodiments.

FIG. 11 is a cross-sectional view illustrating a word line contact structure in accordance with example embodiments and FIG. 12 is a cross-sectional view illustrating a bit line contact structure in accordance with example embodiments.

Referring to FIGS. 11 and 12, an isolation layer 201 may be formed in a semiconductor substrate Sub to define active areas for the first and second word line drivers 220 and 230 and the first and second bit line drivers 260 and 270.

N type impurities may be selectively implanted into the active areas for the first word line driver 220 and the first bit line driver 260 to form n-wells 221n and 261n.

P type impurities may be selectively implanted into the active area for the second word line driver 230 and the second bit line driver 270 to form p-wells 231p and 271p.

Gate electrodes G may be formed on the n-wells 221n and 261n and the p-wells 231p and 271p, respectively. Each of the gate electrodes G may include a conductive material and a gate insulation layer Gox interposed between the gate electrodes G and the semiconductor substrate Sub.

$P^+$ type impurities having a higher concentration than the p-wells 231p and 271p may be implanted into the n-wells 221n and 261n at both sides of the gate electrodes G with to form a source S and a drain D of the PMOS transistors P2 and P5. Thus, the PMOS transistors P2 of the first word line driver 220 and the PMOS transistors P5 of the first bit line driver 260 may be simultaneously formed. The p-wells 231p and 271p may be shielded by a mask when forming the PMOS transistors P2 and P5.

After removing the mask over the p-wells 231p and 271p to expose the p-wells 231p and 271p, the n-wells 221n and 261n may be masked. $N^+$ type impurities having a higher concentration than the n-wells 221n and 261n may be implanted into the p-wells 231p and 271p at the both sides of the gate electrodes G to form a source S and a drain D of the NMOS transistors N2 and N5. Thus, the NMOS transistors N2 of the second word line driver 230 and the NMOS transistors N5 of the second bit line driver 270 may be simultaneously formed.

FIGS. 11 and 12 may show the second PMOS transistor P2 corresponding to the first local word line switch, the fifth PMOS transistor P5 corresponding to the first local bit line switch, the second NMOS transistor N2 corresponding to the second local word line switch and the fifth NMOS transistor N5 corresponding to the second local bit line switch.

A first insulating interlayer ILD1 may be formed on the semiconductor substrate Sub with the PMOS transistors P2 and P5 and the NMOS transistors N2 and N5.

A first level contact CTL1 may be formed in the first insulating interlayer ILD1. The first level contact CTL1 may be connected to the sources S and the drains D of the PMOS transistors P2 and P5 and the NMOS transistors N2 and N5.

A first interconnection line M1 may be formed on the first insulating interlayer ILD1. The first interconnection line M1 may be connected to the first level contact CTL1. The first interconnection line M1 may include a conductive layer comprising at least one of a metal, a silicon material having conductive impurities, etc.

In example embodiments, an interconnection line may be understood as a horizontal connection member extended in a direction substantially parallel to a surface of the semiconductor substrate Sub. A contact may be interpreted as a vertical connection extended in a direction vertical to the surface of the semiconductor substrate Sub.

A second insulating interlayer ILD2 may be formed on the first insulating interlayer ILD1 with the first interconnection line M1. Second level contacts CTL2, CTL2-1, CTL2-2, CTL2-3 and CTL2-4 may be formed in the second insulating interlayer ILD2. The second level contacts CTL2, CTL2-1, CTL2-2, CTL2-3 and CTL2-4 may be connected to the first interconnection line M1.

A second interconnection line M2 and preliminary interconnection lines M2a and M2b may be formed on the second insulating interlayer ILD2. The second interconnection line M2 and the preliminary interconnection lines M2a and M2b may be electrically connected with the second level contacts CTL2, CTL2-1, CTL2-2, CTL2-3 and CTL2-4, respectively.

In example embodiments, the second interconnection line M2 may be electrically connected with the second level contact CTL2. The first preliminary interconnection line M2a may correspond to the horizontal connection member of a word line to be formed. The first preliminary interconnection line M2a may correspond to the conductive wiring Ma in FIG. 9. The first preliminary interconnection line M2a may be configured to connect the second level contact CTL2-1, which may be electrically connected to the drain D of the second PMOS transistor P2, with the second level contact CTL2-2, which may be electrically connected to the drain D of the second NMOS transistor N2.

The second preliminary interconnection line M2b may be a horizontal connection member configured to connect the second level contact CTL2-3, which may be electrically connected to the drain D of the fifth PMOS transistor P5, with the second level contact CTL2-4, which may be electrically connected to the drain D of the fifth NMOS transistor N5. The second preliminary interconnection line M2b may correspond to the conductive wiring Mb in FIG. 9.

A third insulating interlayer ILD3 may be formed on the second insulating interlayer ILD2 with the second interconnection line M2 and the first and second preliminary interconnection lines M2a and M2b. Third level contact CTL3, CTL3-1 and CTL3-2 may be formed in the third insulating interlayer ILD3. The third level contact CTL3 may be connected to the second interconnection line M2 and the first and second preliminary interconnection lines M2a and M2b.

Third interconnection lines M3 may be formed on the third insulating interlayer ILD3. The third interconnection lines M3 may be connected to the third level contact CTL3.

A fourth insulating interlayer ILD4 may be formed on the third insulating interlayer ILD3 with the third interconnection lines M3. A fourth level contact CTL4, CTL4-1 and CTL4-2 may be formed in the fourth insulating interlayer ILD4. The fourth level contact CTL4 may be connected to the third interconnection line M3. Thus, the peripheral circuit 200 of the resistive memory device 10 may be formed.

The fourth level contact CTL4 may be a conductive pattern configured to electrically connect elements in the peripheral circuit 200 with the memory cells (decks).

Each of the fourth level contacts CTL4-1 may physically make contact with any one of the word lines WL11~WL14. Each of the fourth level contacts CTL4-2 may physically make contact with any one of the bit lines BL11~BL14.

In example embodiments, three levels of the interconnection lines are illustrated. However, various embodiments may have different number of levels of interconnection lines. For example, at least four levels of the interconnection lines may be used. Further, the preliminary interconnection lines M2a and M2b may be formed simultaneously with the second interconnection line M2, however, various embodiments may not be limited thereto. For example, the preliminary interconnection lines M2a and M2b may be formed simultaneously with other levels of an interconnection line in the peripheral circuit layer 200.

The word lines WL11~WL14 may be formed on the peripheral circuit layer 200. The word lines WL11~WL14 may be connected to the fourth level contact CTL4-1.

A first memory layer R1 and the bit lines BL11~BL14 may be sequentially stacked on the word lines WL11~WL14 to form the first deck 100a.

Before forming the bit lines BL11~BL14, fifth level contacts CTL5-1 and CTL5-2 may be formed at a selected region of the first deck 100a. The first level contact CTL5-1 may correspond to the vertical connection member configured to connect the fourth level contact CTL4-1 with a word line WL21 for the second deck. The fifth level contact CTL5-2 may be a vertical connection member configured to connect the fourth level contact CTL4-2 with the bit lines BL11~BL14.

The bit lines BL11~BL14 may intersect the word lines WL11~WL14. The memory layer R1 may be arranged at intersected points between the bit lines BL11~BL14 and the word lines WL11~WL14 to define the first deck 100a by the cross point type memory cells MC.

A second memory layer R2 and word lines WL21~WL24 may be stacked on the bit lines BL11~BL14.

The word lines WL21~WL24 may intersect the bit lines BL11~BL14 to define the second deck 100b including the cross point type memory cells MC. The bit lines BL11~BL14 may be shared with the first and second decks 100a and 100b.

In example embodiments, before forming the word lines WL21~WL24 for the second deck 100b, a sixth level contact CTL6-1 may be formed in the second deck 100b to connect the fifth level contact CTL5-1 with the word lines WL21~WL24.

In FIG. 11, the word line WL11 may include a first contact node CN1 contacted to a word line contact structure CT10 including the horizontal connection members M2a and M3 and the vertical connection members CTL3-1 and CTL4-1. For example, the word line contact structure CT10 may be physically (or selectively and electrically) connected to the first local word line switch (i.e., the second PMOS transistor P2) and the second local word line switch (i.e., the second NMOS transistor N2), which are arranged in the first odd X-control block 210-1o.

The word line WL21 may also include a first contact node CN3 contacted to a word line contact structure CT11 including the horizontal connection members M2a and M3 and the vertical connection members CTL3-1, CTL4-1, CTL5-1 and CTL6-1. For example, the word line contact structure CT11 may be physically (or selectively and electrically) connected to the first local word line switch (i.e., the second PMOS transistor P2) and the second local word line switch (i.e., the second NMOS transistor N2), which are arranged in a second odd X-control block 210-2o.

In FIG. 12, each of the bit lines BL11 and BL14 may include a second contact node CN2. For example, the second contact node CN2 of the bit line BL11 and the second contact node CN2 of the bit line BL14 may be disposed at different positions. Each of the second contact nodes CN2 may be contacted with a bit line contact structure CT20 including the horizontal connection members M2b and M3 and the vertical connection members CTL3-2, CTL4-2 and CTL5-2.

Figure 13:
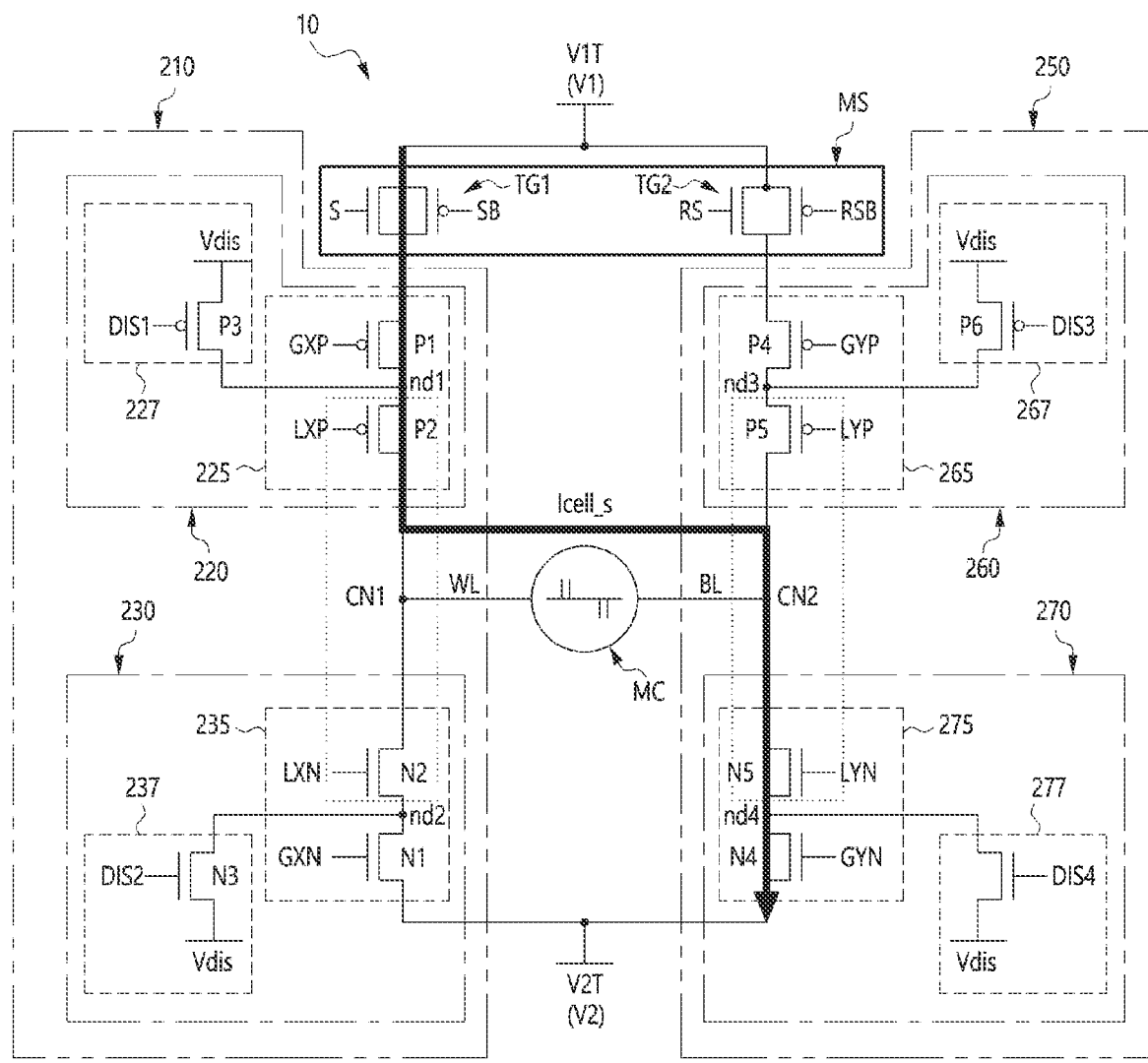
FIGS. 13 and 14 are circuit diagrams illustrating an operation of a resistive memory device in accordance with example embodiments.
Figure 14:
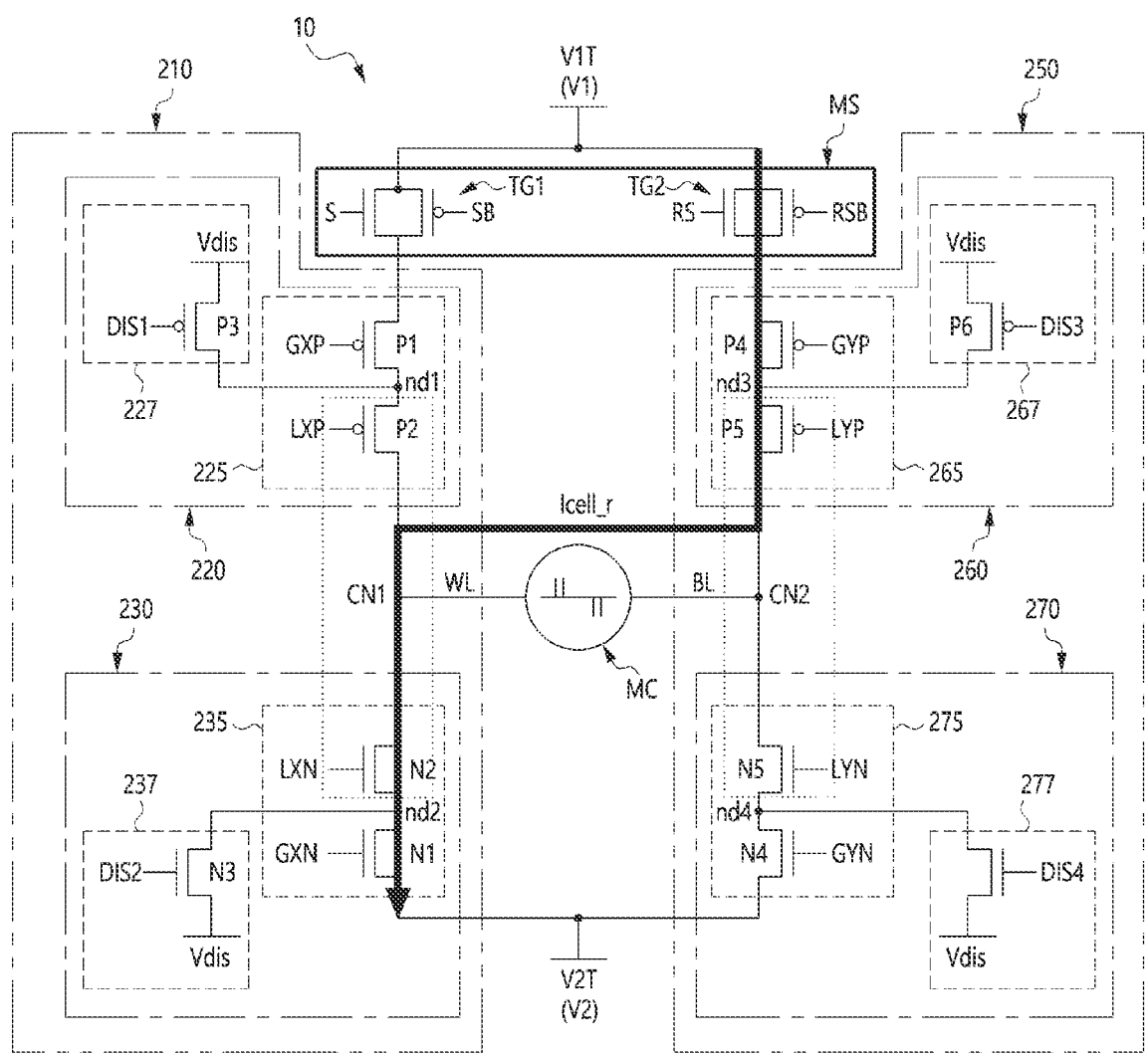

FIGS. 13 and 14 are circuit diagrams illustrating an operation of a resistive memory device in accordance with example embodiments.

Hereinafter, the operation of the resistive memory device receiving the different voltages through one contact node to generate the bi-directional driving current may be illustrated.

Referring to FIGS. 11 to 14, a selected word line WL may include the first contact node CN1 (or CN3), as described above.

The first contact node CN1 of the selected word line WL may be physically (or selectively and electrically) connected with the first word line driver 220 for controlling the set operation and the second word line driver 230 for controlling the reset operation through the word line contact structure CT10.

The structure of the word line contact structure CT10 may be changed in accordance with the position and the level of the selected word line WL. The selected word line WL may be connected to the first word line driver 220 (i.e., the second PMOS transistor P2) and the second word line driver 230 (i.e., the second NMOS transistor N2) by the word line contact structure CT10.

The bit lines BL11~BL14 may each include a second contact node CN2. The second contact node CN2 of a selected bit line BL may be electrically and physically connected with the first bit line driver 260 for controlling the reset operation and the second bit line driver 270 for controlling the set operation through the bit line contact structure CT20.

The structure of the bit line contact structure CT20 may be changed in accordance with the position of the selected bit line BL. The selected bit line BL may be connected to the first bit line driver 260 and the second bit line driver 270 by the bit line contact structure CT20.

Therefore, a set current path Icell_s of the selected memory cell MC may have a length from the first contact node CN1 of the selected word line WL to the second contact node CN2 of the selected bit line BL. A reset current path Icell_r of the selected memory cell MC may have a length from the second contact node CN2 of the selected bit line BL to the first contact node CN1 of the selected word line WL.

Thus, the set current path Icell_s may be substantially the same as the reset current path Icell_r in the selected memory cell to reduce the deviation between the set and reset operations in each of the memory cells of the memory cell array.

According to example embodiments, each of the word line and the bit line of the resistive memory device may receive the different voltages through one contact structure. Thus, the deviation between the set and reset operations of the bi-directional driving current type resistive memory device may be reduced.

The above described embodiments of the present disclosure are intended to illustrate and not to limit to only the described embodiments. Various alternatives and equivalents are possible. Therefore, the disclosure is not limited to only the embodiments described herein. Nor is the disclosure limited to any specific type of semiconductor device. Various additions, subtractions, or modifications may be made to the embodiments described in the present disclosure by a person of ordinary skill in the arts and are intended to fall within the scope of the disclosure, and hence may be claimed in the future. For example, various elements such as, for example, contact nodes, contact lines, contact structures, interconnection lines, connection members, etc., have been described for electrically and/or physically connecting two or more entities. However, various embodiments need not be so limited. Other structures may be used in addition to or in place of those described.

What is claimed is:

1. A resistive memory device comprising:
   a first signal line including a first contact node;
   a second signal line intersecting the first signal line, the second signal line including a second contact node;
   a memory layer at an intersecting portion between the first signal line and the second signal line, the memory layer configured to change its resistance based on a voltage difference between the first signal line and the second signal line;
   a first driver configured to selectively provide the first contact node with a first power voltage;
   a second driver configured to selectively provide the first contact node with a second power voltage different from the first power voltage; and
   a first contact structure configured to electrically connect the first contact node with one of the first driver and the second driver,
   wherein first contact structure comprises:
      at least one horizontal connection line arranged on a level different from a level on which the first signal line is arranged;
      a plurality of first vertical connection plugs configured to connect a first surface of the horizontal connection line with the first driver and the second driver; and
      a second vertical connection plug configured to connect a second surface of the horizontal connection line with the first contact node of the first signal line,
   wherein the first signal line is configured to selectively receive the first and second power voltages through the first contact node, and the second signal line is configured to selectively receive the first and second power voltages through the second contact node.

2. The resistive memory device of claim 1, further comprising:
   a third driver configured to selectively provide the second contact node with the first power voltage;
   a fourth driver configured to selectively provide the second contact node with the second power voltage; and
   a second contact structure configured to electrically connect the second contact node with the third driver and the fourth driver.

3. The resistive memory device of claim 2, wherein the second contact structure comprises:
   at least one horizontal connection line arranged on a level different from a level on which the second signal line is arranged;
   a plurality of first vertical connection plugs configured to connect a first surface of the horizontal connection line with the third driver and the fourth driver; and
   a second vertical connection plug configured to connect a second surface of the horizontal connection member with the second contact node of the second signal line.

4. The resistive memory device of claim 2, further comprising a mode selector configured to selectively provide the first power voltage to one of the first driver and the third driver.

5. A resistive memory device comprising:
   a lower deck including at least one lower memory cell including a first level word line, a lower memory layer, and a bit line that are sequentially stacked, the first level word line having a first contact node and the bit line having a second contact node;
   a peripheral circuit layer arranged under the lower deck, the peripheral circuit layer including a first word line driver, a second word line driver, a first bit line driver and a second bit line driver, wherein:
      the first word line driver is configured to selectively provide the first contact node with a first power voltage,
      the second word line driver is configured to selectively provide the first contact node with a second power voltage different from the first power voltage,
      the first bit line driver is configured to selectively provide the second contact node with the first power voltage, and the second bit line driver is configured to selectively provide the second contact node with the second power voltage;
a first contact structure configured to electrically connect between a selected one of the first word line driver and the second word line driver, and the first contact node of the first level word line; and
a second contact structure configured to electrically connect between a selected one of the first bit line driver and the second bit line driver, and the second contact node of the bit line,
wherein the first contact structure comprises:
at least one first horizontal connection line arranged on a selected plane of the peripheral circuit layer;
a plurality of first vertical connection plugs configured to connect a first surface of the first horizontal connection line with the first word line driver and the second word line driver; and
a second vertical connection plug configured to connect a second surface of the first horizontal connection line with the first contact node of the first level word line.

6. The resistive memory device of claim 5, wherein the first contact structure comprises:
wherein the first horizontal connection line is extended in at least one of a first direction and a second direction, and the first vertical connection plugs are extended in the peripheral circuit layer along a stack direction vertical to the first and second directions.

7. The resistive memory device of claim 5, wherein the second contact structure comprises:
a second horizontal connection line arranged on a selected plane of the peripheral circuit layer;
a plurality of first vertical connection plugs configured to connect a first surface of the second horizontal connection line with the first bit line driver and the second bit line driver; and
a second vertical connection plug configured to connect a second surface of the second horizontal connection line with the second contact node of the bit line.

8. The resistive memory device of claim 6, further comprising an upper deck, including at least one upper memory cell, arranged on the lower deck,
wherein the upper memory cell comprises:
an upper memory layer arranged on the bit line; and
a second level word line arranged on the upper memory layer, the second level word line having a third contact node,
wherein:
the first level word line and the second level word line have different heights than the peripheral circuit layer, and
the bit line has a height between the first level word line and the second level word line.

9. The resistive memory device of claim 8, wherein the peripheral circuit layer further comprises:
a third word line driver configured to selectively provide the third contact node with the first power voltage; and
a fourth word line driver configured to selectively provide the third contact node of the second level word line with the second power voltage.

10. The resistive memory device of claim 9, further comprising a third contact structure configured to electrically connect between a selected one of the third word line driver and the fourth word line driver, and the third contact node,
wherein the third contact structure comprises:
at least one third horizontal connection line arranged on a selected plane of the peripheral circuit layer;
a plurality of third vertical connection plugs configured to connect a first surface of the third horizontal connection line with the first word line driver and the second word line driver; and
a fourth vertical connection plug configured to connect a second surface of the third horizontal connection line with the second contact node of the second level word line.

11. A resistive memory device comprising:
a memory cell array including a first signal line, a second signal line and a memory cell connected between the first signal line and the second signal line; and
a control circuit layer including a first driving block and a second driving block, the first driving block including a first switch configured to selectively provide a first contact node of the first signal line with a first power voltage, and a second switch configured to selectively provide a second contact node of the second signal line with a second power voltage, and the second driving block including a third switch configured to selectively provide the second contact node of the second signal line with the first power voltage, and a fourth switch configured to selectively provide the first contact node of the first signal line with the second power voltage; and
an interconnection structure including a first interconnection connecting the first signal line to the first and fourth switches, and a second interconnection connecting the second signal line to the second and third switches,
wherein the first interconnection includes:
at least one first horizontal connection line arranged on a selected plane of the control circuit layer;
a plurality of first vertical connection plugs configured to connect a first surface of the first horizontal connection line with the first and fourth switches; and
a second vertical connection plug configured to connect a second surface of the first horizontal connection line with a first contact node of the first signal line.

12. The resistive memory device of claim 11, wherein the memory cell array is stacked on the control circuit layer.

13. The resistive memory device of claim 11, further comprising a mode selector configured to selectively control operations of the first driving block and the second driving block.

14. The resistive memory device of claim 11, wherein the second interconnection includes:
at least one second horizontal connection line arranged on a selected plane of the control circuit layer;
a plurality of first vertical connection plugs configured to connect a first surface of the second horizontal connection line with the second and fourth switches; and
a second vertical connection plug configured to connect a second surface of the second horizontal connection line with a second contact node of the second signal line.

15. The resistive memory device of claim 14, further comprising:
a first discharging unit electrically coupled to the first switch, and configured to discharge the first contact node of the first signal line;
a second discharging unit electrically coupled to the second switch, and configured to discharge the second contact node of the second signal line;

a third discharging unit electrically coupled to the third switch, and configured to discharge the second contact node of the second signal line; and
a fourth discharging unit electrically coupled to the fourth switch, and configured to discharge the first contact node of the first signal line.

* * * * *